United States Patent
Lee et al.

(10) Patent No.: US 10,458,722 B2
(45) Date of Patent: Oct. 29, 2019

(54) LATENT HEAT STORAGE MODULE AND LATENT HEAT STORAGE APPARATUS

(71) Applicant: HYUNDAI MOTOR COMPANY, Seoul (KR)

(72) Inventors: Won Bae Lee, Seoul (KR); Joon Yong Song, Anyang-si (KR)

(73) Assignee: Hyundai Motor Company, Seoul (KR)

(*) Notice: Subject to any disclaimer, the term of this patent is extended or adjusted under 35 U.S.C. 154(b) by 507 days.

(21) Appl. No.: 14/711,356

(22) Filed: May 13, 2015

(65) Prior Publication Data
US 2016/0123680 A1    May 5, 2016

(30) Foreign Application Priority Data
Nov. 5, 2014  (KR) .................. 10-2014-0152870

(51) Int. Cl.
| | |
|---|---|
| *F28D 20/02* | (2006.01) |
| *C09K 5/06* | (2006.01) |
| *F28F 9/007* | (2006.01) |
| *F28D 20/00* | (2006.01) |

(52) U.S. Cl.
CPC ............ *F28D 20/023* (2013.01); *C09K 5/063* (2013.01); *F28D 2020/0021* (2013.01); *F28F 9/0075* (2013.01); *Y02E 60/145* (2013.01)

(58) Field of Classification Search
CPC ........... F28D 20/023; F28D 2020/0021; C09K 5/063; F39F 9/0075; Y02E 60/145
USPC .......................................................... 165/10
See application file for complete search history.

(56) References Cited

U.S. PATENT DOCUMENTS

| | | | | |
|---|---|---|---|---|
| 4,011,736 A | * | 3/1977 | Harrison ................... | F25D 1/00 165/10 |
| 4,170,261 A | | 10/1979 | Laing et al. | |
| 4,462,224 A | * | 7/1984 | Dunshee ................ | A61F 7/106 206/219 |
| 5,005,368 A | * | 4/1991 | MacCracken .......... | F24F 1/025 62/139 |
| 5,036,904 A | * | 8/1991 | Kanda ................... | F28D 20/021 165/10 |
| 5,239,839 A | * | 8/1993 | James ..................... | F25D 3/005 126/400 |
| 5,524,453 A | * | 6/1996 | James ................... | F24F 5/0017 62/434 |
| 5,644,929 A | * | 7/1997 | Tanaka .................. | B60H 1/005 62/406 |

(Continued)

FOREIGN PATENT DOCUMENTS

| | | |
|---|---|---|
| CN | 103930746 A | 7/2014 |
| JP | 61-204179 U | 12/1986 |

(Continued)

OTHER PUBLICATIONS

Chinese Office Action issued in Application No. 201510284868 dated Mar. 28, 2018.

*Primary Examiner* — Raheena R Malik
(74) *Attorney, Agent, or Firm* — Morgan, Lewis & Bockius LLP (57) ABSTRACT

A latent heat storage module includes a plurality of film packs configured to accommodate a phase change material configured to use phase change latent heat as a heat medium of room temperature (0° C. or more). A guide is configured to fix the plurality of film packs.

2 Claims, 7 Drawing Sheets

(56) References Cited

U.S. PATENT DOCUMENTS

| | | | | |
|---|---|---|---|---|
| 5,896,914 | A * | 4/1999 | Fieback | F28D 1/0308 165/10 |
| 6,343,485 | B1 * | 2/2002 | Duerr | B60H 1/005 62/430 |
| 6,854,513 | B2 * | 2/2005 | Shirota | B60H 1/005 165/10 |
| 6,889,751 | B1 * | 5/2005 | Lukas | B60H 1/00492 165/10 |
| 7,406,998 | B2 * | 8/2008 | Kudo | F28D 20/02 165/10 |
| 8,171,984 | B2 | 5/2012 | Christ et al. | |
| 2001/0028791 | A1 * | 10/2001 | Salyer | F24H 7/0433 392/341 |
| 2004/0046147 | A1 * | 3/2004 | Matsuda | C09K 5/063 252/70 |
| 2010/0012289 | A1 * | 1/2010 | Haussmann | F28D 7/08 165/10 |
| 2012/0168111 | A1 * | 7/2012 | Soukhojak | F28D 15/043 165/10 |
| 2013/0153169 | A1 * | 6/2013 | Perryman | F28D 20/021 165/10 |
| 2013/0240188 | A1 | 9/2013 | Xiang et al. | |
| 2014/0298796 | A1 * | 10/2014 | Dunn | F03B 17/025 60/531 |
| 2016/0146509 | A1 * | 5/2016 | Chen | F24S 60/00 126/619 |

FOREIGN PATENT DOCUMENTS

| | | |
|---|---|---|
| JP | 10-037336 A | 2/1998 |
| JP | 2002-349910 A | 12/2002 |
| JP | 2002-364886 A | 12/2002 |
| JP | 2003336979 A * | 11/2003 |
| JP | 2005-009829 A | 1/2005 |
| JP | 2007-322102 A | 12/2007 |
| JP | 2008-241174 A | 10/2008 |
| KR | 10-0337689 B1 | 5/2002 |
| KR | 10-1429164 B1 | 8/2014 |

* cited by examiner

LATENT HEAT STORAGE MODULE AND LATENT HEAT STORAGE APPARATUS

CROSS-REFERENCE TO RELATED APPLICATION

This application is based on and claims the benefit of priority to Korean Patent Application No. 10-2014-0152870, filed on Nov. 5, 2014 in the Korean Intellectual Property Office, the disclosure of which is incorporated herein by reference in its entirety.

TECHNICAL FIELD

The present disclosure relates to a latent heat storage module and a latent heat storage apparatus, and more particularly, to a module for storing latent heat and an apparatus including the same.

BACKGROUND

An electricity demand management is classified into various kinds, but may be generally classified into load management and efficiency improvement. The load management is conducted with the object of aiming at load balance by reducing a difference between a maximum load and a minimum load by increasing a midnight demand and improving usage efficiency of a power supply system.

A cooling load of the summer season is a main cause that decreases a reserve margin. Cold storage technology reduces a peak demand and increases a midnight load by shifting cooling power demand of peak hours to midnight hours in order to perform peak shifting.

Water ($H_2O$) is a cold storage material that is most commonly used. An ice thermal storage system using latent heat of water (quantity of heat required to change ice of 1 kg at 0° C. to water at 0° C., 80 kcal/kg) and a water storage system performing cold storage by using sensible heat of water (quantity of heat required to rise temperature of water of 1 kg by 1° C., 1 kcal/kg), that is, a temperature difference of water (generally, using a temperature difference of 10° C., 10 kcal/kg) have been used.

Since the ice thermal storage system has latent heat density (storage quantity of heat per unit volume, $kcal/m^3$) larger than that of the water storage system, an installation space may be saved. However, temperature of cool water to be supplied for an air-conditioning is generally 7° C. and the ice thermal storage system needs to generate ice at ° C. lower than the supply temperature, a refrigerator producing a low temperature heat medium (generally, referred to as a brine) at −5° C. or less should be installed. Therefore, the ice thermal storage system has running efficiency (COP) lower than that of the water storage system producing the cool water by using a general room temperature refrigerator.

A phase change material (PCM) capable of using phase change latent heat as a heat medium of the temperature of a room (0° C. or more) has been considered as an alternative for load management and efficiency improvement. The phase change material (PCM) is generally classified into an organic material and an inorganic material.

Figure 1A:
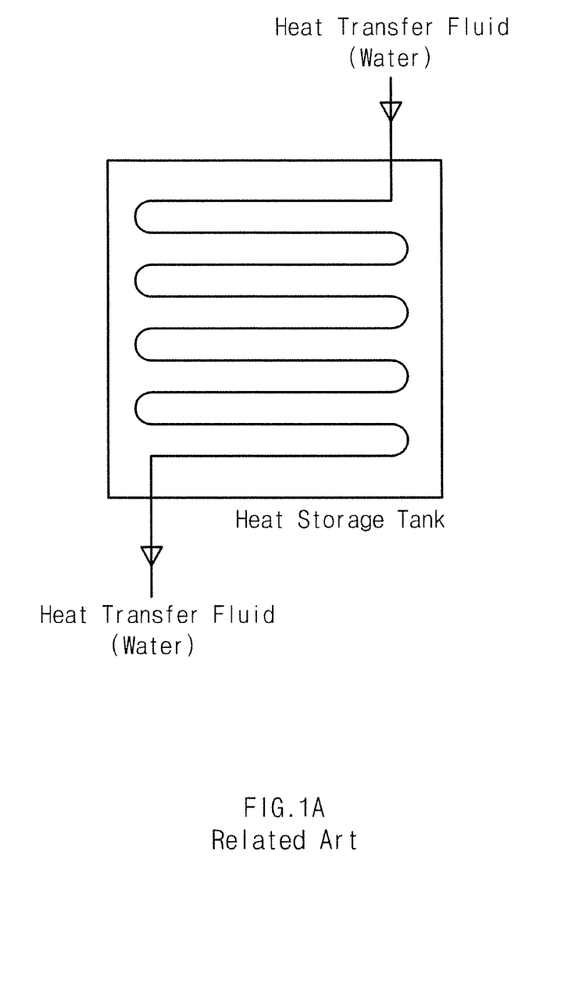
FIGS. 1A and 1B show heat storage systems according to the related art.
Figure 1B:
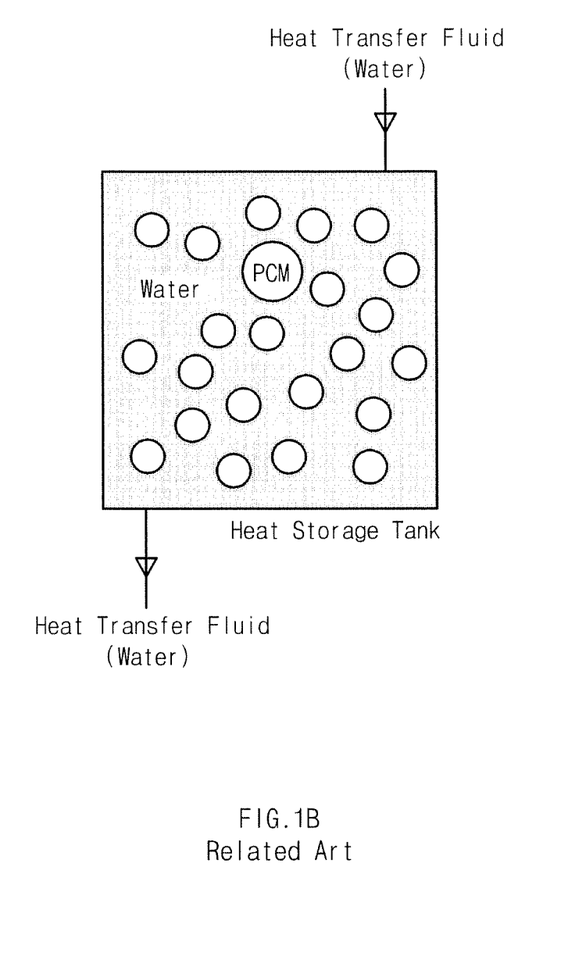

FIGS. 1A and 1B show heat storage systems according to the related art.

FIG. 1A shows a heat storage apparatus of a coil type, wherein the phase change material is stored in a heat storage tank and a heat pipe in which a heat medium may flow is installed between the phase change materials. A heat transfer fluid performs heat-exchange with the phase change material stored in the heat storage tank through the heat pipe and stores cold heat. Heat storage performance of the phase change material has heat storage efficiency changed depending on an arrangement of the heat pipe, a pipe material, a pipe shape. The heat storage tank of the coil type is a technology capable of forming an optimal heat medium channel and increasing heat storage density. However, according to the heat storage tank of the coil type, the phase change material starts to change from liquid to solid at an outer wall of the heat pipe and there may be thermal resistance that does not allow the phase change material, which is still in the liquid state and contains heat, to smoothly perform the heat exchange with the heat pipe due to the above-mentioned crystallization phenomenon.

In addition, since the most robust phase change materials among organic material have low thermal conductivity, thermal resistance due to the crystallization phenomenon causes the heat storage according to the phase change to take a long time. As a result, degradation in heat storage or heat discharging rate may be caused. In order to reduce the thermal resistance according to the crystallization phenomenon, it may be solved by densely arranging the heat pipe, but such heat storage apparatus becomes expensive.

FIG. 1B shows a related art heat storage apparatus of a capsule type, wherein the phase change material is encapsulated or packed in capsules within water in the heat storage tank. The water acts as a heat medium. That is, this is a system transferring heat to the phase change material by the heat medium flowing between the capsules in the heat storage tank. Although a heat transfer rate is varied depending on a size and a surface area of the capsule and the packing of the phase change material, and quality of the material thereof, the heat storage tank may be installed at a relatively inexpensive price. However, since it is difficult to form a channel shape guiding a flow of the heat medium as in the coil type, it is difficult to uniformly store heat. This generates a supercooling phenomenon, which causes damage. Since the most robust phase change materials and capsule materials are lighter than the heat medium, a phenomenon in which the phase change material floats due to a density difference may occur, which causes the capsule to be damaged.

SUMMARY

The present disclosure has been made to solve the above-mentioned problems occurring in the prior art while advantages achieved by the prior art are maintained intact.

An aspect of the present disclosure provides a latent heat module and a latent heat storage apparatus capable of preventing a film pack accommodating a phase change material from being damaged.

An aspect of the present disclosure also provides a latent heat module and a latent heat storage apparatus capable of easily installing and carrying packs storing a phase change material by modularizing the packs.

However, objects of the present disclosure are not limited to the objects described above, and other objects that are not described above may be clearly understood by those skilled in the art from the following description.

According to an exemplary embodiment of the present inventive concept, a latent heat storage module includes: a plurality of film packs configured to accommodate a phase change material configured to use phase change latent heat as a heat medium of room temperature (0° C. or more). A guide is configured to fix the plurality of film packs.

According to another exemplary embodiment of the present inventive concept, a latent heat storage apparatus includes at least one latent heat storage module including a plurality of film packs configured to accommodate a phase change material configured to use phase change latent heat as a heat medium of room temperature (0° C. or more). A heat storage tank may be configured to accommodate the at least one latent heat storage module and has water flowing therein. A plate may be disposed in the heat storage tank and configured to form a channel in which the water flows.

Specific matters of other exemplary embodiments will be included in a detailed description and the accompanying drawings.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION

Advantages and features of the present inventive concept and methods to achieve them will be elucidated from exemplary embodiments described below in detail with reference to the accompanying drawings.

However, the present inventive concept is not limited to exemplary embodiments disclosed below, but will be implemented in various forms. The exemplary embodiments of the present inventive concept make discussion of the present inventive concept thorough and are provided so that those skilled in the art can easily understand the scope of the present inventive concept. Therefore, the present disclosure will be defined by the scope of the appended claims. Like reference numerals throughout the specification denote like elements.

Hereinafter, the present disclosure will be described with reference to the accompanying drawings for describing a latent heat storage module 30 and a latent heat storage apparatus 40 according to exemplary embodiments of the present disclosure.

Figure 2:
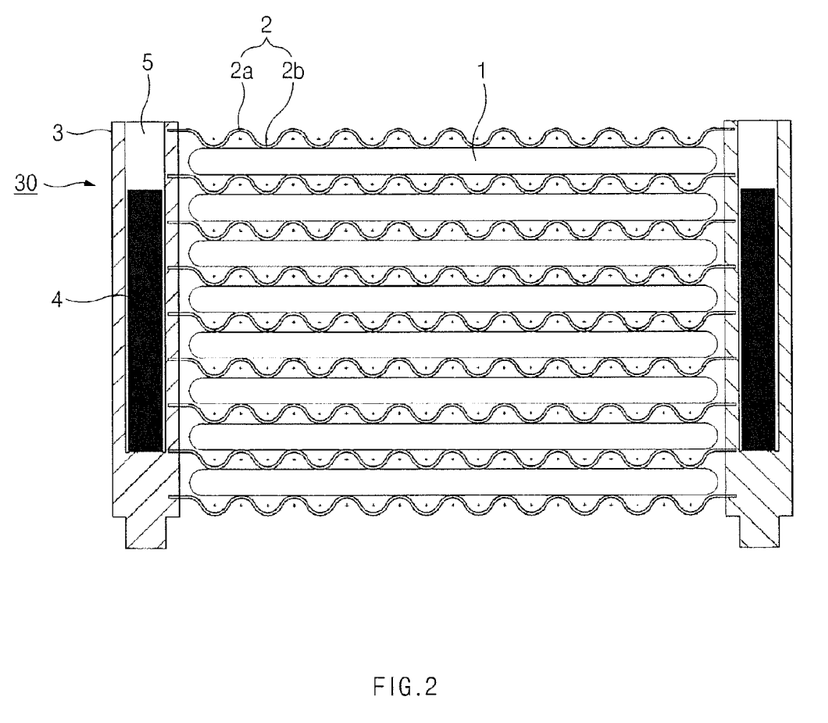
FIG. 2 is a cross-sectional view of a latent heat storage module according to an exemplary embodiment of the present inventive concept.

FIG. 2 is a cross-sectional view of a latent heat storage module according to an exemplary embodiment of the present disclosure.

Referring to FIG. 2, the latent heat storage module 30 according to an exemplary embodiment of the present disclosure includes a plurality of film packs 1 accommodating a phase change material capable of phase change latent heat as a heat medium of room temperature (0° C. or more); and a guide 3 fixing the plurality of film packs 1.

The latent heat storage module 30 according to an exemplary embodiment of the present disclosure includes tetradecane PCM of n-paraffin series, which is an organic material, so as to use latent heat generated from a process in which tetradecane PCM is coagulated from liquid to solid or is dissolved from solid to liquid. In addition, the latent heat storage module 30 adopts a stationary plate type heat exchange system so as to be able to increase heat storage density of the phase change material, increase heat transfer rate of the phase change material and the heat medium, and increase heat storage/heat discharging rate in a heat storage tank 10.

The latent heat storage module 30 according to an exemplary embodiment of the present disclosure includes a ballast 4 fixed to the guide 3 so as to prevent the film packs 1 from being floated on water. The guide 3 has a hollow 5 into which the ballast 4 is inserted.

The plurality of film packs 1 are stacked and the guide 3 stands so as to face end portions of the plurality of film packs 1, thereby fixing the plurality of film packs 1. The film packs 1 are formed of a flexible material. The film packs 1 may be formed of a pp or pe material.

Figure 3:
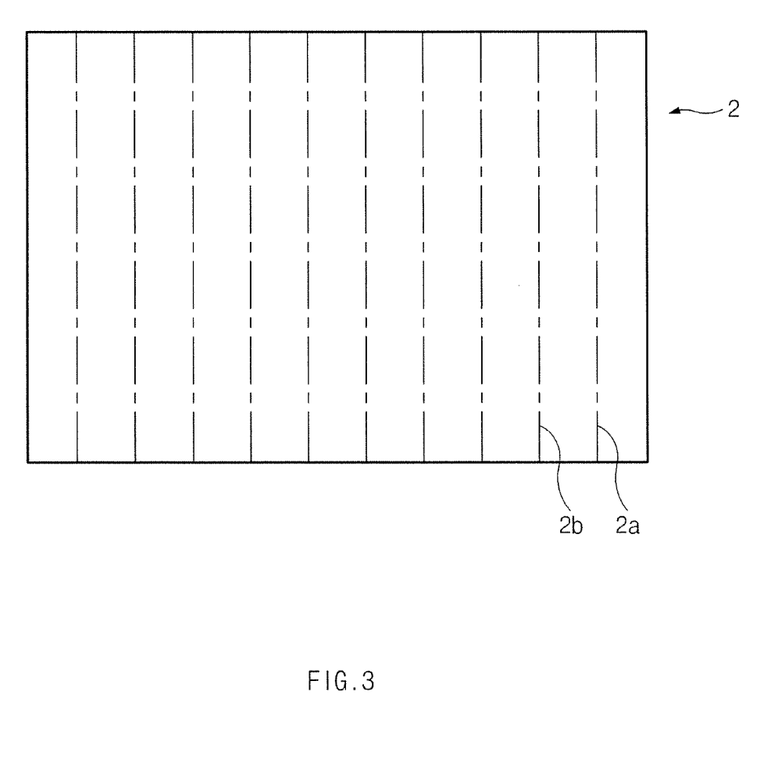
FIG. 3 is a plan view of a hot plate according to an exemplary embodiment of the present inventive concept.

FIG. 3 is a plan view of a hot plate according to an exemplary embodiment of the present disclosure.

Referring to FIG. 3, the latent heat storage module 30 according to an exemplary embodiment of the present disclosure includes a hot plate 2 disposed so as to face one surface of at least one of the plurality of film packs 1 and suppressing deformation of the film packs 1. The hot plate 2 has a plurality of hills $2a$ and valleys $2b$ formed thereon, so as to form a channel between the hills $2a$ and valleys $2b$, and the film packs 1. The hills $2a$ and the valleys $2b$ are formed so as to be in parallel to each other. The channel is formed between the hills $2a$ and the valleys $2b$. The heat medium flows through the channel formed between the hills $2a$ and the valleys $2b$.

The phase change material is tetradecane ($C_{14}H_{30}$) of n-paraffin series, which is an organic material. The phase change material (PCM) capable of using phase change latent heat as a heat medium of room temperature (0° C. or more) has been considered as an alternative for load management and efficiency improvement. The phase change material (PCM) is generally classified into an organic material and an inorganic material.

In the present disclosure, tetradecane ($C_{14}H_{30}$) of n-paraffin series, which is an organic material that is inexpensive, is chemically stable, has phase change temperature of 5.9° C., and has an amount of latent heat of 54.8 kcal/kg is used.

Figure 4:
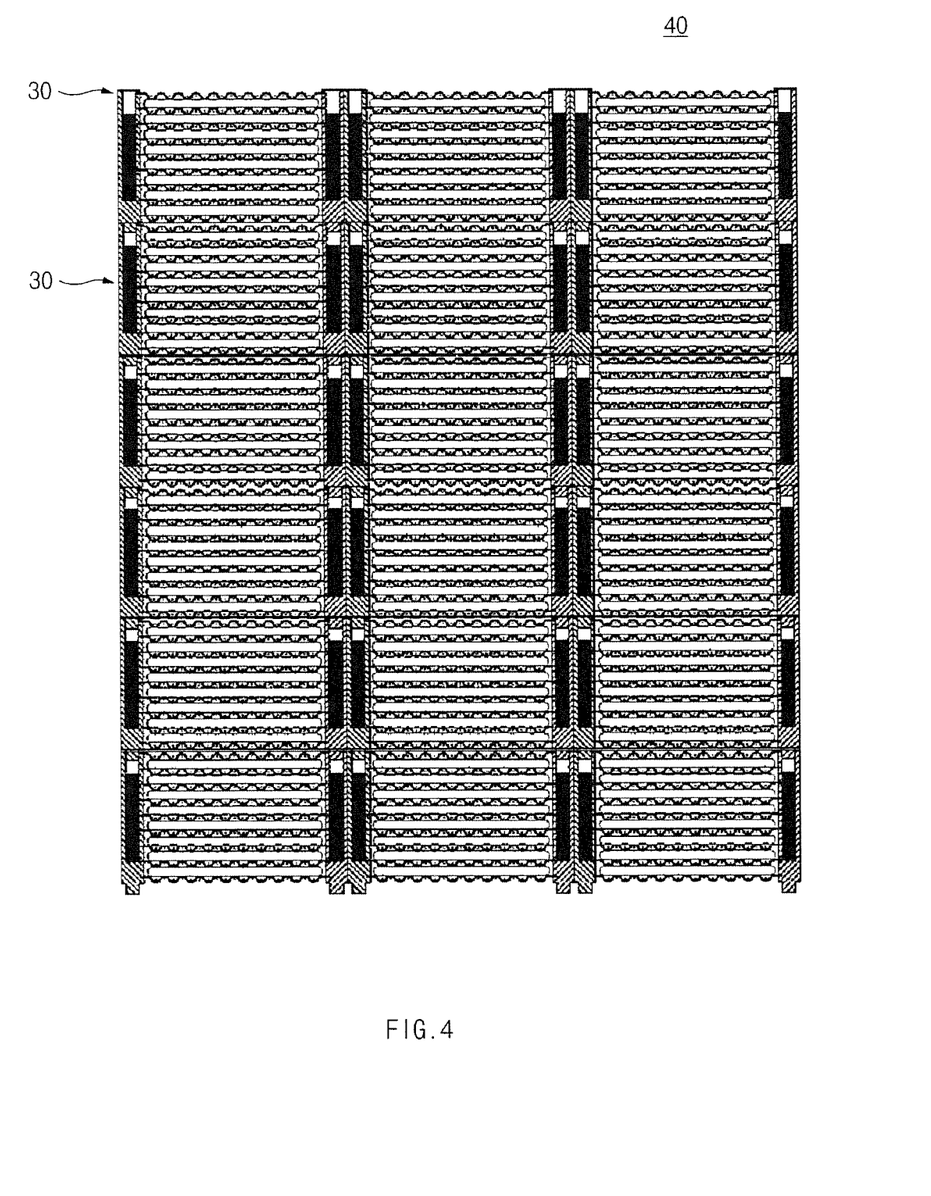
FIG. 4 shows a shape in which the latent heat storage modules according to an exemplary embodiment of the present inventive concept are stacked.
Figure 5:
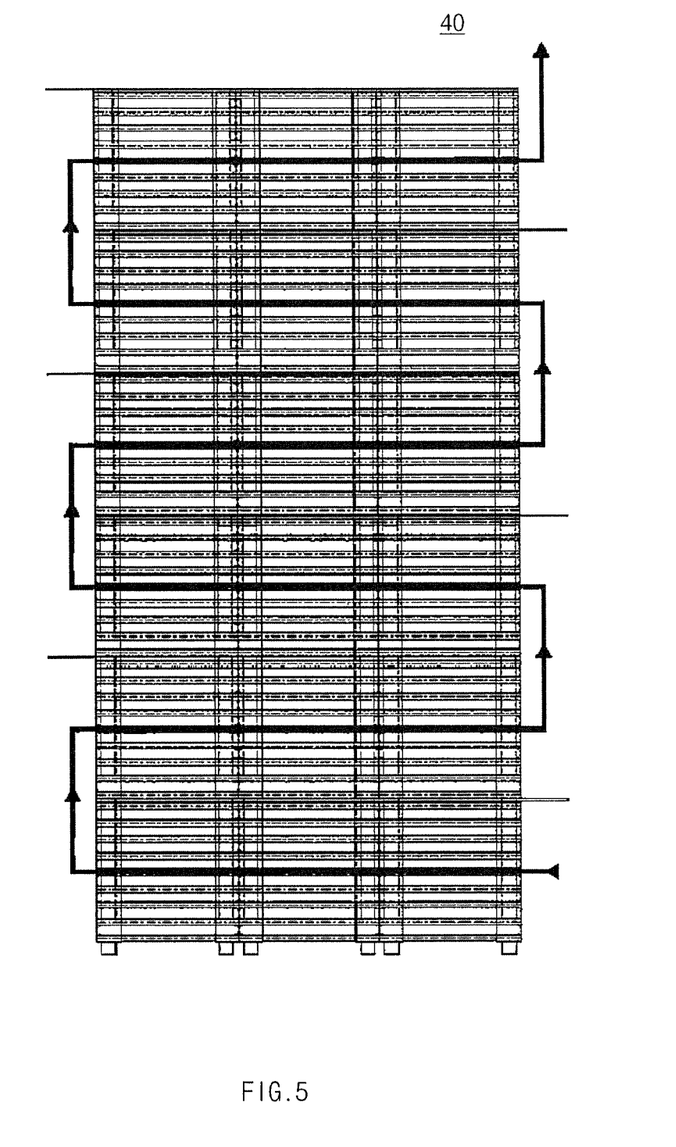
FIG. 5 shows a channel of a heat medium passing through the stacked latent heat storage modules of FIG. 4.
Figure 6:
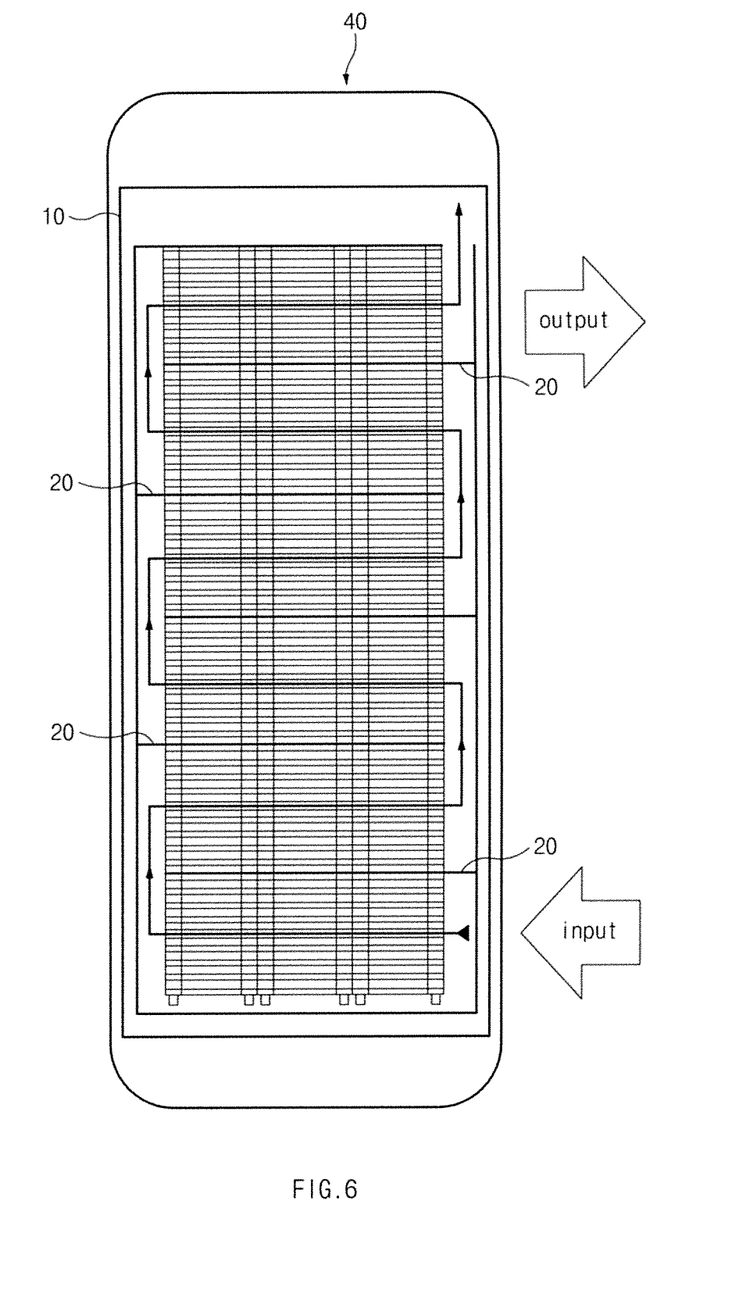
FIG. 6 is a latent heat storage apparatus according to an exemplary embodiment of the present inventive concept.

FIG. 4 shows a shape in which the latent heat storage modules according to an exemplary embodiment of the present disclosure are stacked. FIG. 5 shows a channel of a heat medium passing through the stacked latent heat storage modules of FIG. 4. FIG. 6 is a latent heat storage apparatus according to an exemplary embodiment of the present disclosure.

Referring to FIGS. 4 to 6, the latent heat storage apparatus 40 according to an exemplary embodiment of the present disclosure includes a latent heat storage module 30 including a plurality of film packs 1 accommodating a phase change material capable of phase change latent heat as a heat medium of room temperature (0° C. or more) and a guide 3 fixing the plurality of film packs 1; a heat storage tank 10 accommodating the latent heat storage module 30 and having water flowing therein; and a plate 20 disposed in the heat storage tank 10 so as to form a channel in which water flows.

In certain embodiments, a plurality of latent heat storage modules 30 may be provided and the heat storage tank 10 may form the channel flowing between the plurality of latent heat storage modules 30 in a horizontal direction. The latent heat storage module 30 and the latent heat storage apparatus according to the present disclosure configured as described above have advantages of a capsule type maintaining a shape of the phase change material with a packing material which is easily manufactured and a coil type capable of increasing heat exchange efficiency by forming the channel of the heat medium.

In addition, the latent heat storage module and the latent heat storage apparatus according to the present disclosure have a structure capable of preventing a decrease in efficiency due to a crystallization phenomenon and supercooling and floating phenomena occurring in the capsule type.

Since the phase change material used in the present embodiment, which is tetradecane of n-paraffin series, has specific gravity lower than water, which in this embodiment is used as the heat medium, it may float on an upper portion of the heat storage tank 10 due to a density difference. This causes the packs storing the phase change material to be densified to the upper portion of the heat storage tank 10, thereby decreasing heat storage/heat discharging efficiency. Therefore, embodiments of the present inventive concept have a structure in which the film packs 1 having the phase change material packed therein are stacked between the hot plates 2 in order to uniformly maintain distribution of the phase change material and increase the heat storage density. Bends have been formed on the hot plate 2 in order to increase a heat exchange area between the film packs 1 and the heat medium and increase shape strength.

The latent heat storage module 30 according to an exemplary embodiment of the present inventive concept has a stacked structure and is modularized in a shape having a size and weight that may be installed and carried by manpower. In addition, the latent heat storage module 30 according to an exemplary embodiment of the present inventive concept has a structure preventing the floating due to the density difference and forms the channel using a guide 3 bar so that the heat medium may flow between the latent heat modules.

According to an exemplary embodiment of the present inventive concept, the following advantages may be provided.

As described above, according to the exemplary embodiments of the present disclosure, it is possible to prevent the film pack accommodating the phase change material from being damaged.

The packs storing a phase change material may be easily installed and carried by modularizing the packs.

However, effects of the present disclosure are not limited to the effects described above, and other effects that are not described above may be clearly understood by those skilled in the art from the following description.

Although the exemplary embodiments of the present inventive concept have been disclosed for illustrative purposes, those skilled in the art will appreciate that various modifications, additions and substitutions are possible, without departing from the scope and spirit of the present inventive concept as disclosed in the accompanying claims. Accordingly, such modifications, additions and substitutions should also be understood to fall within the scope of the present inventive concept.

What is claimed is:

1. A latent heat storage apparatus comprising:
   at least one latent heat storage module comprising a plurality of film packs configured to accommodate a phase change material, the phase change material configured to use phase change latent heat as a heat medium of room temperature (0° C. or more);
   a heat storage tank configured to accommodate the at least one latent heat storage module, the heat storage tank having water flowing therein; and
   a plate disposed in the heat storage tank and configured to form a channel in which the water flows,
   wherein the at least one latent heat storage module further comprises:
   a guide configured to fix the plurality of film packs;
   a ballast configured to be fixed to the guide and prevent the film packs from floating on water; and
   a hot plate disposed on a surface of at least one of the plurality of film packs and configured to suppress deformation of the at least one of the plurality of film packs,
   wherein the guide has a hollow into which the ballast is inserted, and
   wherein the hot plate has a plurality of hills and valleys formed thereon, so as to form channels between the plurality of hills and valleys of the hot plate and the plurality of film packs.

2. The latent heat storage apparatus according to claim 1, wherein the at least one latent heat storage module is a plurality of latent heat storage modules, and
   the heat storage tank includes a channel flowing between the plurality of latent heat storage modules in a horizontal direction.

* * * * *